US 6,477,460 B2

(12) United States Patent
Kepler

(10) Patent No.: US 6,477,460 B2
(45) Date of Patent: Nov. 5, 2002

(54) PROCESS AND SYSTEM FOR THE ANNOTATION OF MACHINE-GENERATED DIRECTIONS WITH EASILY RECOGNIZED LANDMARKS AND OTHER RELEVANT INFORMATION

(75) Inventor: Michael A. Kepler, Aloha, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 0 days.

(21) Appl. No.: 09/796,269

(22) Filed: Feb. 27, 2001

(65) Prior Publication Data

US 2002/0120397 A1 Aug. 29, 2002

(51) Int. Cl.[7] .............................. G06F 19/00; G06F 7/00
(52) U.S. Cl. ...................................... 701/209; 340/990
(58) Field of Search ................................. 701/209, 201, 701/208, 200; 73/178 R; 340/990, 995

(56) References Cited

U.S. PATENT DOCUMENTS

| | | | | |
|---|---|---|---|---|
| 5,177,685 A | * | 1/1993 | Davis et al. ................. | 455/456 |
| 5,608,635 A | * | 3/1997 | Tamai ......................... | 701/209 |
| 5,691,980 A | * | 11/1997 | Welles, II et al. ........... | 370/316 |
| 5,751,228 A | * | 5/1998 | Kamiya et al. .............. | 340/988 |
| 5,802,492 A | * | 9/1998 | DeLorme et al. ............ | 455/456 |
| 5,832,406 A | * | 11/1998 | Iwami et al. ................. | 701/202 |
| 5,848,373 A | * | 12/1998 | DeLorme et al. ............ | 340/990 |
| 5,948,040 A | * | 9/1999 | DeLorme ..................... | 701/201 |
| 5,983,158 A | * | 11/1999 | Suzuki et al. ................ | 701/209 |
| 5,999,879 A | * | 12/1999 | Yano ............................ | 701/208 |
| 6,016,485 A | * | 1/2000 | Amakawa et al. ........... | 705/400 |
| 6,049,753 A | * | 4/2000 | Nimura ........................ | 701/201 |
| 6,076,041 A | * | 6/2000 | Watanabe .................... | 340/988 |
| 6,125,323 A | * | 9/2000 | Nimura et al. .............. | 701/207 |
| 6,128,571 A | * | 10/2000 | Ito et al. ....................... | 701/201 |
| 6,133,853 A | * | 10/2000 | Obradovich et al. ........ | 340/905 |
| 6,144,318 A | * | 11/2000 | Hayashi et al. ............. | 340/988 |
| 6,199,014 B1 | * | 3/2001 | Walker et al. ............... | 701/211 |
| 6,208,934 B1 | * | 3/2001 | Bechtolsheim et al. ..... | 701/209 |
| 6,249,740 B1 | * | 6/2001 | Ito et al. | |
| 6,252,544 B1 | * | 6/2001 | Hoffberg .................. | 342/357.1 |
| 6,253,151 B1 | * | 6/2001 | Ohler et al. ................. | 701/208 |
| 6,314,367 B1 | * | 11/2001 | Ohler et al. ................. | 701/208 |

FOREIGN PATENT DOCUMENTS

JP 08069248 * 3/1996

* cited by examiner

Primary Examiner—William A. Cuchlinski, Jr.
Assistant Examiner—Olga Hernandez
(74) Attorney, Agent, or Firm—Kaye Scholer LLP

(57) ABSTRACT

A method and system for annotating machine-generated directions for a route with retain signage and other readily-recognizable landmarks. The coordinates of a selected area of the route are obtained. The selected area of the route can be any portion of the route from an origination point to a destination point. However, the coordinates of turns along the route as well as points along long stretches of road in the route are of particular interest. Once the coordinates of interest are determined, a database is scanned to identify one or more landmarks or establishments within a definable zone about the coordinates. A scoring algorithm may be employed to score the qualifying landmarks and establishments using factors such as distance, orientation and visibility. Alternatively, a radius search may be performed for establishments that lie within a given radius of the user's geo-coded location along the travel route, said given radius may be determined by an expansion factor. Means may be employed to limit the number of landmarks or establishments to be annotated. Once the landmarks or establishments are decided upon, driving directions are generated that incorporate one or more of the landmarks or establishments within the zone in the instructions regarding navigation of the route.

45 Claims, 6 Drawing Sheets

PROCESS AND SYSTEM FOR THE ANNOTATION OF MACHINE-GENERATED DIRECTIONS WITH EASILY RECOGNIZED LANDMARKS AND OTHER RELEVANT INFORMATION

FIELD OF THE INVENTION

The present invention seeks to improve machine-generated and turn-by-turn travel directions so that they are expressed in a manner that is similar to how directions are expressed by humans. Specifically, the present invention relates to a method for annotating turn-by-turn travel directions with retail signage and other commonplace landmarks.

BACKGROUND OF THE INVENTION

There are numerous methods for electronically generating turn-by-turn and point-to-point directions for surface travel by motor vehicle, on foot, and etc. These systems utilize one or more databases containing geographic information that correlates information about roads and other features to an objective physical grid expressed in numeric values, usually latitude and longitude. In addition to, or as an adjunct to, generating turn-by-turn directions, these systems are capable of resolving street addresses to physical locations represented by specific records in the geographic database. This process is often called "geocoding".

Often, people attempting to follow directions generated by such systems, especially when traveling in unfamiliar territory, have difficulty correctly identifying the locations where they must negotiate a turn. Further, when traveling between turns, users have nothing to reassure them they are in the right place and moving in the right direction.

For example, existing systems typically inform users that they should be traveling in a particular compass direction, which can be of limited use if the individual lacks a compass. Similarly, these systems typically inform users that they should proceed on a particular route segment for a specified number or fraction of miles, which requires automotive users to divert their attention from driving to consult an odometer. Existing systems often inform users that they should proceed towards an intersection for a specified number of miles, which requires users to divert their attention from driving to consult an odometer. Existing systems typically inform users that they should proceed towards an intersection with a particular street, which can be of limited use if the user is unfamiliar with the sequence of cross streets and cannot see street signs that may be distant, poorly placed or missing.

Thus, existing automated route-generation systems may produce routes that are technically correct and precise, yet they can in many cases be prohibitively difficult for human users to follow successfully.

SUMMARY OF THE INVENTION

In view of the above-stated disadvantages of the prior art, an object of the invention is to provide a process and system for annotating machine-generated and turn-by-turn directions with the names of businesses and other common landmarks. The recognizability, size, illumination and prominent display of typical retail signage greatly improves the ease with which a traveler may orient themselves to the route that they are navigating and identify the locations where they must perform a maneuver. The present invention is an improvement over street names alone, because retail signage is larger, more prominently placed and better illuminated than most street signs. This annotation in interjected into the turn-by-turn directions at each turn or other maneuver. Also, it may be interjected between turns or other maneuvers along the route.

It is a further object of this invention to provide a means of adjusting the number and frequency of the annotations interjected into the turn-by-turn directions and to resolve cases where there are more candidate annotations than are desired for a particular turn or other route segment.

It is also an objective of this invention to provide a means to arbitrarily adjust the probability of a particular business name's inclusion in generated routes. This creates a novel means to generate revenue by charging business for a greater likelihood that their business name will be annotated along the route.

In accordance with one embodiment of the invention, a first functional component of the system generates turn-by-turn travel directions along a route. The first component provides geocodes of turns and other locations along the route. A second functional component of the system provides access to business listings referenced by geocode. A third functional component of the system selects points along the route to consider for annotation. A fourth functional component of the systems selects the business listing for which the geocoded location is within a radius of the point along the route selected for annotation and annotates the turn-by-turn travel directions with the business listings.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

I. OVERVIEW

Figure 1:
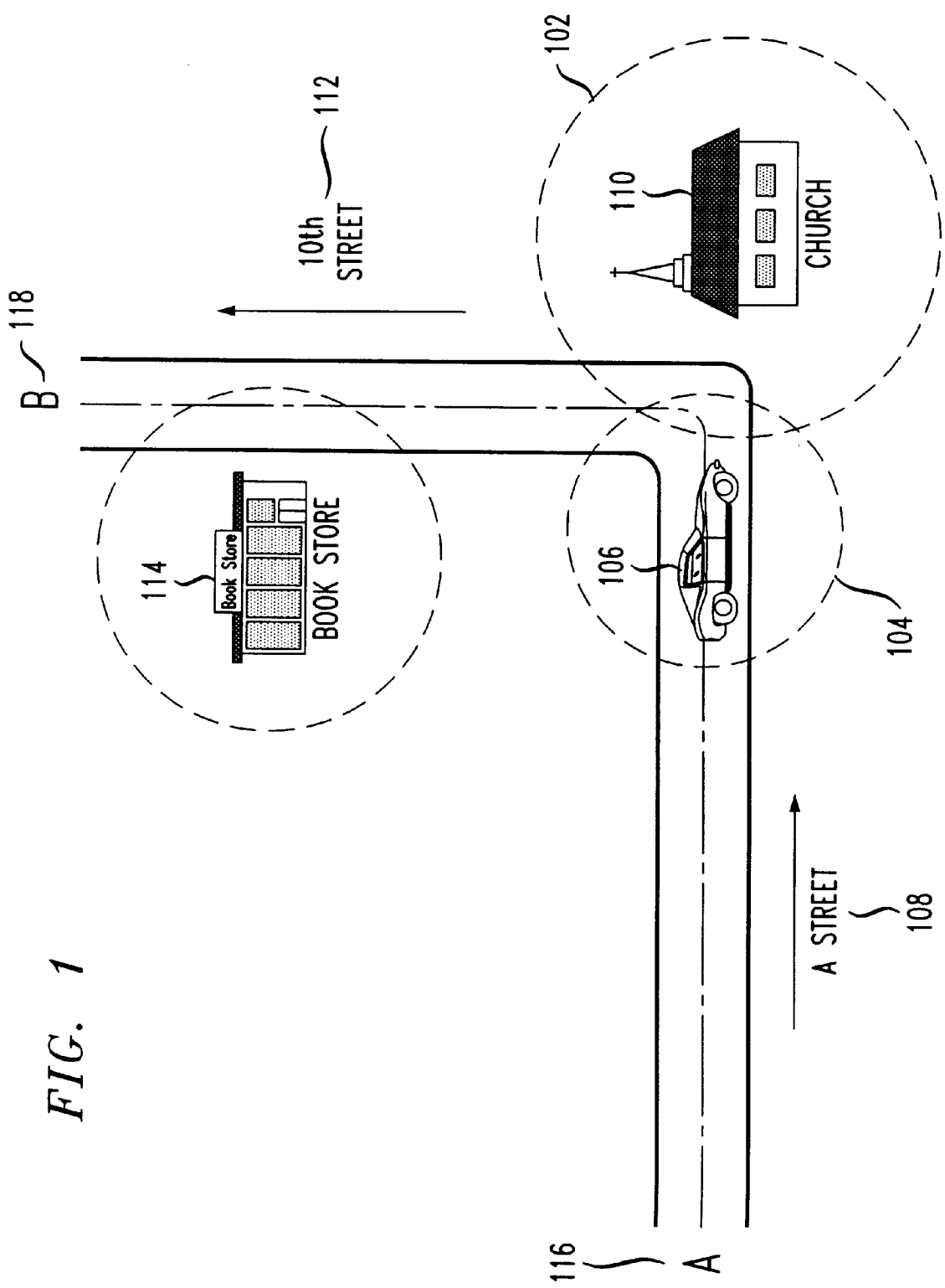
FIG. 1 provides a first illustration of a traveler along a route, the illustration providing an example for practicing the present invention according to a preferred embodiment.

The following embodiments will be described in the context of a process and system for the annotation of machine-generated directions with easily recognized landmarks and other relevant information. Those skilled in the art, however, will recognize that the disclosed methods and structures are adaptable for broader applications. If the same reference numeral is repeated with respect to different figures, it refers to the corresponding structure in each figure.

II. DESCRIPTION

According to a preferred embodiment, the present invention includes a system capable of generating turn-by-turn travel directions for a specified travel route. The travel directions may be (1) graphically displayed on a map with street names and a user's location; (2) verbally conveyed to the user; or (3) conveyed to the user through written text. System is also capable of generating geocodes of turns and other locations along the generated travel route. Such geocodes are capable of being interjected in the directions as initially generated or provided on-demand for specific turns or other segments of a previously generated route. It is understood to one skilled in the art that any available form of access to generated routes and correlated geocodes are accommodated and contemplated by the present invention.

System is capable of generating a footprint centering on known points in the generated route. This footprint of the route may be a uniform extrapolation of the known points along the route. Alternatively, the footprint may result from an asymmetric expansion from the known points.

The extent of the route footprint is configurable based upon preset expansion factors. The configurability of the route footprint advantageously allows the present invention to adjust the likelihood of an annotation being generated and included in a particular travel route segment. Where information about the type and condition of the travel corridor is available, either in whole or specific to each route segment, the system is capable of expanding a footprint proportionally based upon preset expansion factors. Route segments with more expansive footprints are more likely to receive annotation. Illustratively, one would place a very small expansion factor on route segments that are known to be automotive freeways, as end-users traveling in automobiles on a freeway can be presumed to need fewer and less frequent annotations added to that portion of their route, and in fact might be detrimentally distracted by excessive annotation. Alternatively, one would place a higher expansion factor on route segments that are known to include complex maneuvers as end-users traveling in automobile are likely to need more frequent annotation to these areas.

The footprint of the route is the Boolean sum of the potentially overlapping radial expansions of each known point along the route. The internal representation of the route footprint consists of the coordinates and individually calculated radii of each known point along the route.

The present invention also includes a system and database capable of providing access to business listings referenced by geocode. These systems and databases are capable of being generated from information assembled from a plurality of sources. These databases comprise residential, government and business listings, which can include street addresses and/or phone numbers. The database may comprise geocoded points along the travel route. Said geocoded points may comprise: (1) business listings that are referenced by geocodes; (2) residential listings that are referenced by geocodes; (3) governmental listings that are referenced by geocodes; (4) landmarks that are referenced by geocodes; (4) road conditions that are referenced by geocodes; and (5) weather conditions that are referenced by geocodes. Some of these databases comprise extended information such as an indication of the type of business, in the case of business listings, and some will accommodate the storage of geographic coordinates, such as latitude and longitude.

There are known methods by which geographic databases and systems are used in conjunction with mailing and/or directory listings databases and systems to resolve street addresses to geographic coordinates, such as a latitude and longitude. These geocodes can be generated on the fly for transitory needs or stored in the mailing and/or directory listings database.

This invention is also capable of performing spatial radius searches and Boolean comparisons of geographic locations expressed in terms of latitude/longitude or some other systematic method of representing spatial information. These spatial radius searches and Boolean comparisons are capable of operating upon both data representing single points in space and data representing a geographic or spatial footprint of any shape. These methods allow the determination of relative proximity of and overlaps between represented locations and footprints. For example, this makes it possible for a geocoded database of business listings to be queried for listings located within a specified radius of a specified point.

Another function of this invention is to generate footprints centering on locations of entities desirable for inclusion in route annotations. An entity may be any statically stored or dynamically generated or acquired location. Illustratively, these may be business locations that are represented by geocoded listings in a directory or mailing database.

These footprints may be simple radial expansions of a single point or proportional expansions of existing footprints that may be of any previous shape and size. The footprint may represent the physical shape and size of the entity or it can represent the effective extension of the entity for given purposes or criteria. For example, visibility is one of the most useful criteria for a point to be included in a travel route annotation; so, points along the travel route possessing characteristics that enhance visibility may be represented by a larger footprint for the purposes of practicing this invention. The maintainer or administrator of an embodiment of this invention can establish between patterns in the content of data related to notable entities and factors by which to add or detract from the extent of the footprint of that entity.

Illustratively, when such data is available, business listings in a directory or mailing database possessing words or sub-strings in their content that indicate that they are a highly visible type of business, then this business listing is assigned a higher footprint expansion factor than other listings for less visible types of businesses. For example, if the word "gasoline" appears in a data element, which contains business category information, this may be judged as a high-visibility type of business and be assigned a high footprint expansion factor. The same entity can posses a number of characteristics represented in the related data which may bring about the applicability of more than one factor. In such cases, the effective fact is the net sum of all applicable positive and negative factors. To expand upon the previous "gasoline" example, one listing may have in the data element representing business name a keyword indicating a widely-recognized chain of gasoline stations, and thus receive additional positive bias on the net expansion factor, while another may have in the same data element a keyword indicating a chain of commercial fueling stations not widely known to the general public, and this second listing may receive an actual negative bias applied to its net expansion factor. These expansion factors can be stored in the database containing the notable entities, or it can be dynamically calculated and applied based upon the content a separate data structure representing correlations between patterns of data content and expansion factors. In an alternative embodiment of this invention, expansion factors can be applied based upon business arrangements between the provider of the directions service or system and the ownership of business or other entities that can be included in route annotations.

In an alternative embodiment of this invention, notable entities are considered as single points in space and the criteria by which footprint expansion factors would be calculated are instead applied to calculating a numeric priority number for the entity. This is a difference only in how the resulting factor is used, but not in how or by what criteria it is calculated.

Notable entities need not be static entities in a database, but also can be dynamically acquired location-specific objects that are of interest to travelers. A given implementation of this invention, or even a given instance of the use of this invention, can involve multiple sources of entities of interest, including both static and dynamic entities. Transitory entities that can be scheduled, such as road closures, can be stored in a database which also stores effective and ending dates and times for these entities. The invention can be configured to consider of such records only those that are relevant to the current date and time. Transitory entities that are dynamically acquired, such as auto accidents or localized weather conditions, while immediately relevant, can be assigned an ending date and time based upon estimates of how long they are expected to last, where such data is available.

The next important function is the selection of points along the route to consider annotation. Every point in the generated route that represents a turn or other maneuver or change in heading that is normally listed in the turn-by-turn directions generated by the directions system is a candidate for additional notation of landmarks or other relevant information. Additionally, points along the route that lie between the turns and other points normally listed can be considered as points to provide additional information. For example, an implementation of this invention could be configured to provide additional information, where available, at regular and configurable intervals of distance along inter-turn segments that exceed a configurable overall length. Additionally, where information about the nature of a travel corridor is available, such information can be used to bias the distance interval between notations, which has a similar affect on the frequency and density of annotation as does the biasing of route segment footprint based upon travel corridor characteristics, as previously described.

For each point along the route selected for annotation, the system, according to the present invention, performs a radius search against the database of points along the travel route. The radius search uses the geocode of the user's position on the travel route as the center point of the search and the previously established radial expansion factor of that point as the radius for the search. The records in the database for points along the travel route having their geocoded location within that radius are the results of the search. These records are referred to as respondent records.

There is a potential for a plurality of respondent records for each selected route point. The invention implements a method for limiting the number of notable entities to include in the annotation for a single route point. In most cases, it would be most desirable to limit the annotation to a single point along the travel route. To implement such limitation, the invention uses available footprint data for the points and performs a Boolean overlay of these footprints and the footprint of the user's position on the travel route. Points are selected for annotation based upon how close to or encompassing of the user's position each of them is, according to straightforward Boolean logic. In the event of a tie by Boolean logic, raw entity footprint expansion factors are compared, with higher values prevailing. If a tie still remains, then it can be resolved by a number of arbitrary means, such as random selection. One skilled in the art of this invention understands that a number of logical variations on this means of selecting notable entities are contemplated to be within the scope of this invention.

In an alternative embodiment, rather than employing Boolean comparison of route footprints and notable entity footprints, a simple selection among those entities whose geocodes were selected in the radius search may be accomplished through a numeric ranking by the footprint expansion factor of the notable entities. As with the Boolean solution, ties are resolved through any convenient arbitrary means, including random selection. This alternative embodiment has the advantage of being considerably less computationally intense than the Boolean approach, which may be advantageous in some resource-limited environments.

It is presumed that it is known in which direction on the route the traveler is proceeding, thus one skilled in the art can see that it is a simple matter to determine if the noted entity will be to the right or left of the traveler when they are at the relevant route point.

After the system selected the notable entities to include in the annotation for a route point, the system generates the actual annotations and interjects them into the generated route description. In the case of a textual route, sentence templates are established with blanks filled in by the name of the entity, illustratively a business name from a directory database, and the position (left or right) in which the entity will be observed when the traveler is at the route point. Additionally, information from the original description may be parsed, through means familiar to one skilled in the art, and inserted into the new sentence template. An example sentence might read something like "turn right onto Oak Street when you see a 7–11 on your left." In instances where there is more than one notable entity selected for a given route point, either a number of sentence templates appropriate for varying numbers of notations need to be created. A more flexible and sophisticated sentence composition scheme may be employed. One skilled in the art related to this invention will readily perceive that there are a number of approaches to automated sentence generation that are adaptable to this purpose.

In systems employing graphical representation of the travel route, instead of or in addition to composing descriptive sentences, the present invention supplies the system performing the rendering of the map with sufficient information to include a graphical indicator of a point of interest at the locations of the selected notable entities. Where available, this graphical representation can be an actual logo, in the case of business locations as notable entities. For systems that have such functionality, the invention also provides a name or other informative text to the system which renders the route map such that the route map can be displayed to the user when the visual indicator of the notable entity is selected through a mouse click or other means.

The annotation process is repeated for every point selected for annotation. There remains, especially in remote areas or in situations where there is limited notable entity data available, the possibility that there will be no qualified notable entities for a particular route point. In such cases, the original generated route description will remain unchanged for that route point.

In yet another alternative embodiment, the invention implements somewhat of an inversion of its normal logic. There may be landmarks that are of extremely high priority to note whenever reasonably possible. For example, a business may pay a premium price for assurance that their business will be noted every time it is encountered on a generated route, regardless of whether the location of the business falls at one of the route points normally selected for notation. For example, the priority business or landmark may fall between the regularly spaced noted route points in an inter-turn route segment. To accommodate this need, a pre-selected set of high-priority notable entities is always considered for inclusion in annotations for every route. Further, rather than using route points and radii as criteria for searching notable entities as outlined above, the geocoded locations of the high-priority entities are used to perform a progressively expansive radius search of all known points along the generated route. The result of such a search is the point in the route closest to the high priority entity. It would be reasonable to impose a constraint of a configurable maximum distance between the closest route point and the high priority entity, which if exceeded would preclude inclusion of the entity in an annotation for that route.

III. SEVERAL EMBODIMENTS OF THE INVENTION

In the following paragraphs, the present invention is described through several embodiments of the invention.

In one embodiment of the invention, a method of generating driving directions for a travel route comprises obtaining the geographic location of a selected area along the travel route. Next, landmarks within the geographic location of the selected area are identified. This identification process may be accomplished by searching a database that contains information regarding the landmarks' geographic position. This search may be performed by accessing the database for records corresponding to landmarks that have a geographic location within a predefined distance or orientation relative to the geographic location. Since, the search may identify several landmarks along the route, the landmarks may be scored based upon several factors including: (1) the distance of the landmarks to the geographic location of the selected area; and (2) the landmarks' visibility. The landmarks with the highest scores may be selected for annotation. Finally, the driving directions may be graphically displayed or audibly recited to the user. In both cases, at least one landmark in the selected area is identified and annotated in the driving directions.

In another embodiment of the invention, a method of generating driving directions for a travel route comprises obtaining the geographic location of a selected area along the travel route. Next, one or more geographical zones are identified that are proximate to the selected area along the route. Landmarks that are within this zone are identified. The size of the geographic zone may be varied, depending upon information about the route. This information may include the complexity of the driving directions for the route and the route's type and condition.

In another embodiment of the invention, a method for generating driving directions for a travel route comprises obtaining coordinates that are proximate to a portion of the travel route that corresponds to an appropriate location to confirm that a traveler is proceeding along the prescribed route. Establishments are identified that are within a definable zone about the coordinates. Establishments are then selected to be included in the driving directions. The identification and selection process may be performed by maintaining a database that includes information regarding the establishments' geographic locations. The database may be searched to identify establishments having a geographic location within a predefined distance or predefined orientation from the appropriate location. Alternatively, a radius search, which takes into consideration an expansion factor, may be performed to identify establishments. In either case, since the search may identify several establishments along the route, the establishments may be scored based upon several factors including: (1) the distance of the establishments to the geographic location of the selected area; and (2) the establishments' visibility. The establishments with the highest scores may be selected for annotation. Finally, the driving directions may be graphically displayed or audibly recited to the user. In both cases, at least one establishment in the selected area is identified and annotated in the driving directions.

The database may contain information other than simply records regarding establishments' geographic locations. For example, in another embodiment of the invention, the database may comprise records indicating that establishments have entered into a financial relationship with a directions provider to promote the establishments through the provisions of driving directions. The database then may be searched to identify establishments having a geographic location within a predefined distance or predefined orientation from the appropriate location. Since the search may identify several establishments along the route, the establishments may be scored based upon several factors including: (1) the amount paid by the establishment to promote the establishment through the provision of driving directions; (2) the distance of the establishments to the geographic location of the selected area; and (3) the establishments' visibility. The establishments with the highest scores may be selected for annotation and then annotated in the driving directions.

Similarly in another embodiment of the invention, the database may comprise records of dynamically acquired and location-specific objects and data regarding the geocoded position of these objects. Dynamically-acquired and location-specific objects may comprise: (1) auto accidents; (2) road conditions (i.e., auto accidents, ice or snow); (3) weather conditions; and (4) road construction. The database then may be searched to identify said objects having a geographic location within a predefined distance or predefined orientation from the appropriate location. A scoring system may be used to rank the objects. The objects with the highest scores may be selected for annotation and then annotated in the driving directions.

IV. FIGURES

In the following paragraphs, several embodiments of the invention are described by referring to FIGS. 1 through 5.

FIG. 1 depicts an embodiment of the invention. The objects annotated in the map may be generated from a database containing geocodes, names of businesses, landmarks and street addresses. As the user travels from Point A 116 to Point B 118, the system may interject appropriate verbal or textual information as the user's car 106 nears an annotated object such as the church 110 (i.e., depicted by the intersection of a radius of the car 104 with a radius of the church 102). For example, as the user drives his car 106 along "A" Street 108 and approaches the church 110, the system may verbally state to the user: "Turn left from "A" Street 108 onto $10^{th}$ Street 112 at the church 110." Once the user turns onto $10^{th}$ Street 112, the system may further verbally state: "Continue along $10^{th}$ Street 112 while passing the book store 114 on your left hand side until proceeding to your destination."

Figure 2:
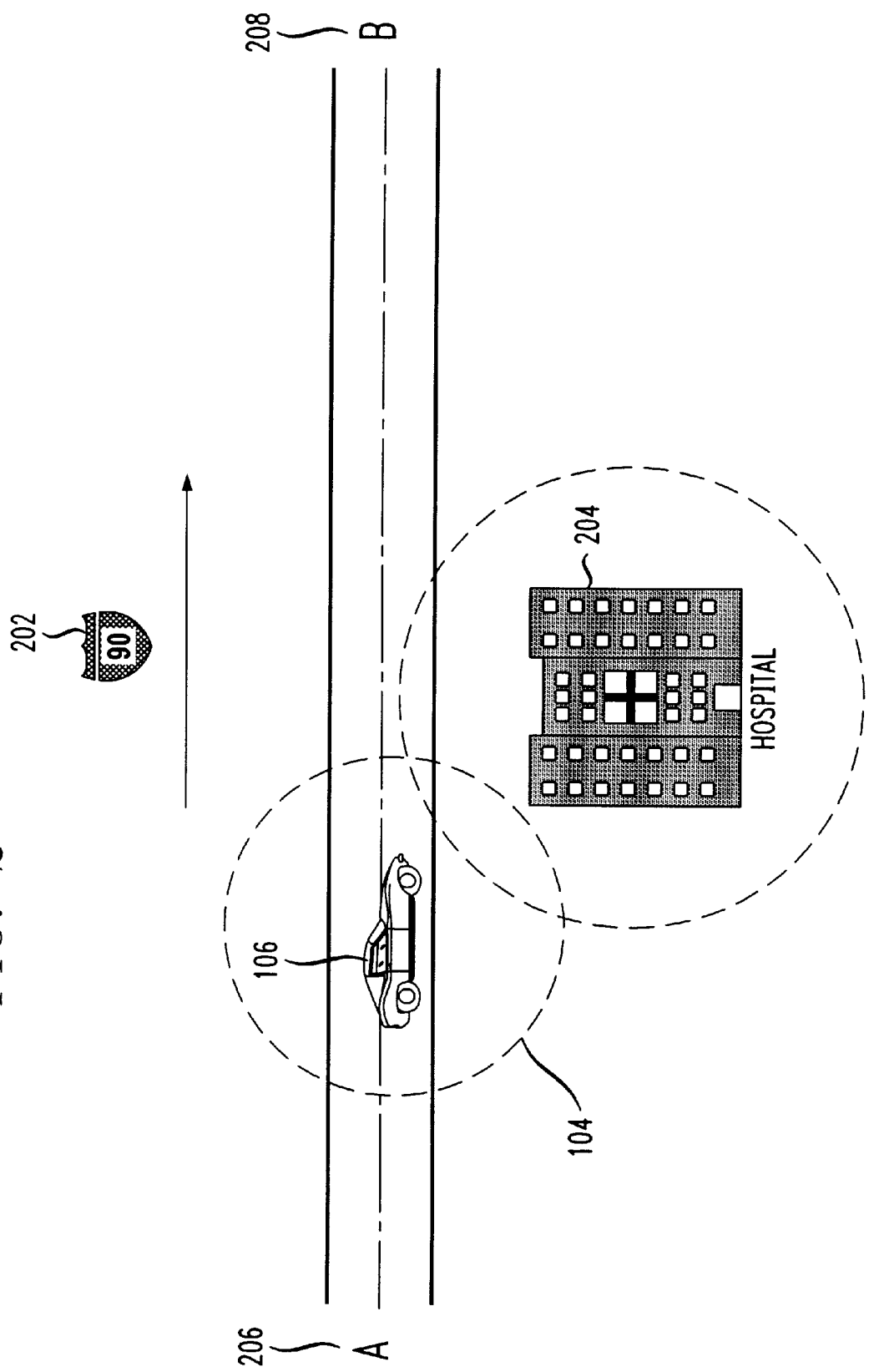
FIG. 2 provides a second illustration of a traveler along a route, the illustration providing an example for practicing the present invention according to a preferred embodiment.

FIG. 2 is another embodiment of the invention. As the user drives his car 106 down Interstate 90 202 from point A 206 toward point B 208, the system may verbally indicate to the user when nearing the hospital 204: "Continue along Interstate 90 202 for another five miles and pass the hospital 204 on your right." The hospital 204 may be an example of a highly visible object or prominent landmark along the route. FIG. 2 may be an example of the use of a small expansion factor for the footprint. This is because a user may need a less detailed map when driving along a highway or interstate. Accordingly, the only annotation appearing on the map may be the hospital 204, as shown in FIG. 2.

Figure 3:
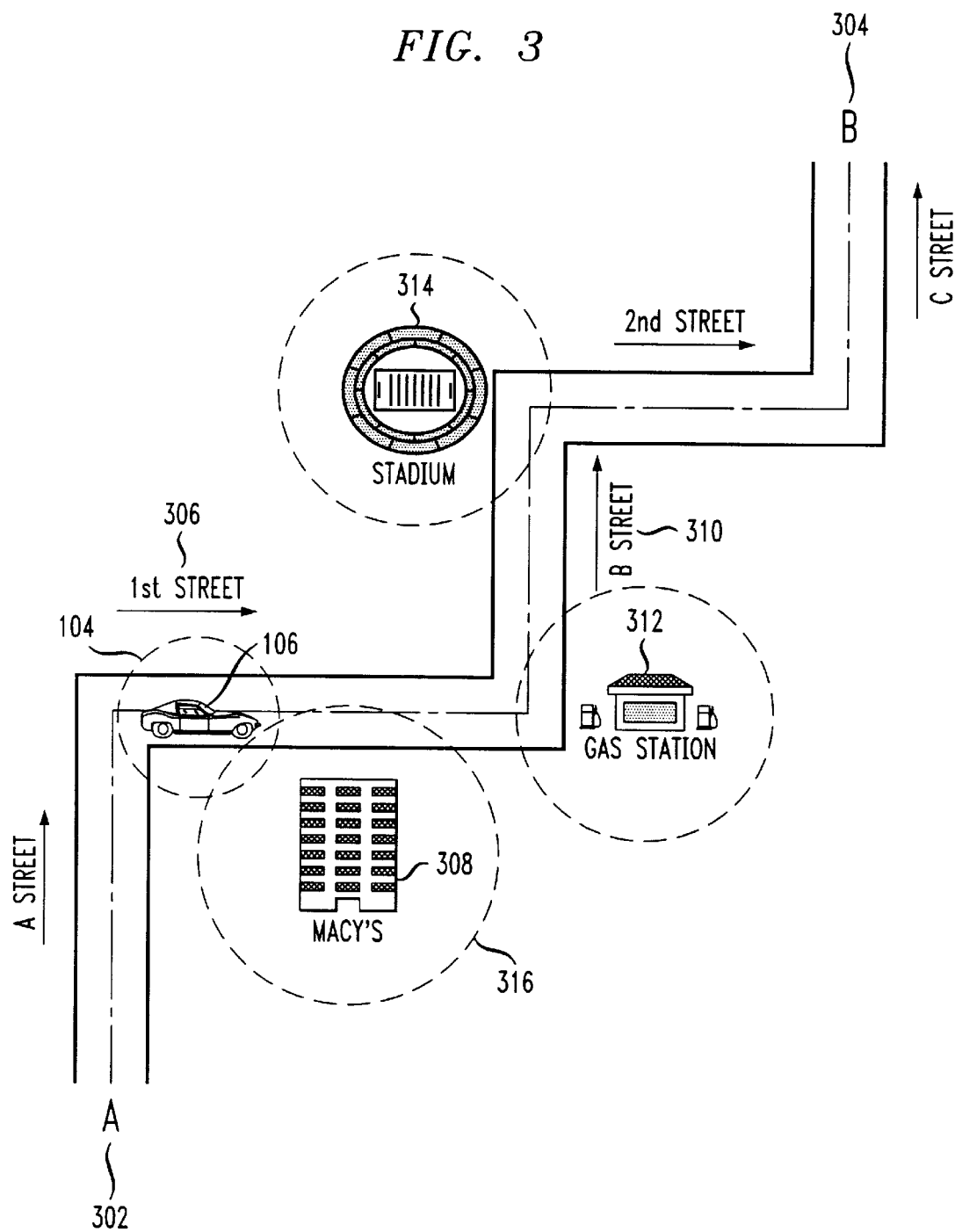
FIG. 3 provides a third illustration of a traveler along a route, the illustration providing an example for practicing the present invention according to a preferred embodiment.

FIG. 3 is another embodiment of the invention. Here, the user is driving his car 106 through a complex route from Point A 302 to Point B 304. Since the route has complex maneuvers, a high expansion factor may be used for the footprint. This results in a more annotated and detailed map and makes the driving directions easy to follow. For example, as the user proceeds in his car 106 along $1^{st}$ Street 306 and nears Macy's 308 (depicted by the intersection of the radius of the car 104 and the radius of Macy's 316), the system may verbally inform the user: "Continue along $1^{st}$ Street 306 and pass Macy's 308 on your right side." Macy's, 308, a well-known commercial retail store, may be an example of a priority entity or business that is of high priority to annotate. This may be because the business has paid a premium to have its location annotated whenever possible along a generated route. Continuing along with our example, as the user proceeds down $1^{st}$ Street 306 and nears the intersection of $1^{st}$ Street 306 and "B" Street 310, the system may state: "Turn left onto "B" Street 310 at the Gas Station 312." The Gas Station 312 may be an example of a business listing that is easily recognized and therefore is interjected in the turn-by-turn travel directions so as to make the travel directions user friendly. After the driver turns onto "B" Street 310 and nears the Stadium 314, the system may state, "Continue Driving along "B" Street 310, and you will pass the Stadium 314 on your left hand side. The Stadium 314 may be an example of a well-known landmark in the city, and therefore the present invention interjects it into the travel directions to make the directions easy to follow. The turn-by-turn travel directions would continue until the user arrives at his destination point B 304.

Figure 4:
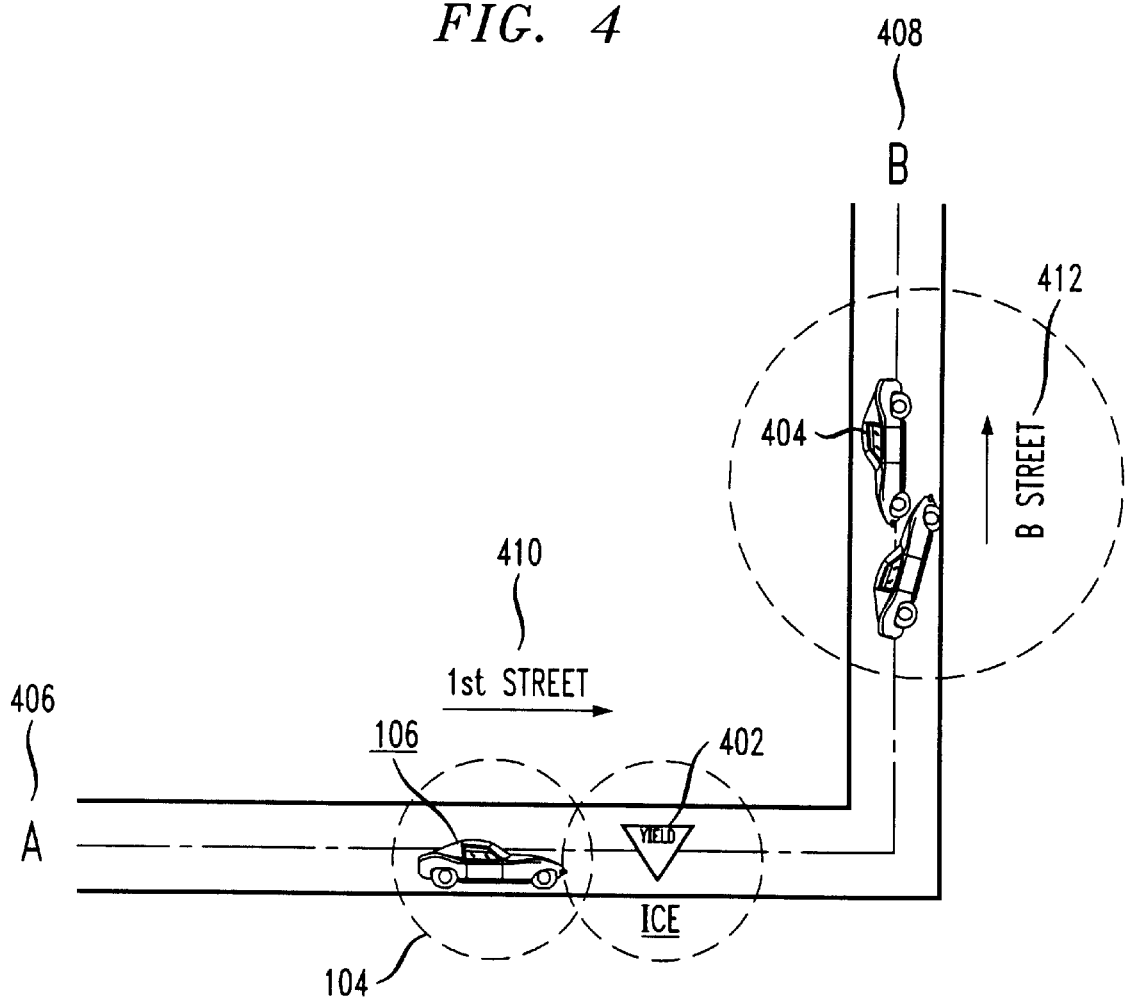
FIG. 4 provides a fourth illustration of a traveler along a route, the illustration providing an example for practicing the present invention according to a preferred embodiment.

FIG. 4 is another embodiment of the invention that illustrates two dynamically acquired objects—dangerous road conditions (e.g., ice) and an auto accident. Specifically, in addition to annotating statically acquired objects (i.e., objects that are fixed in place), the system is also capable of generating dynamically acquired and location-specific objects of interest to travelers. A dynamically acquired and location-specific object may be auto accidents, road construction or weather conditions. As shown in FIG. 4, as the user proceeds along the route from Point A 406 to Point B 408, the system may warn the user of dangerous road conditions that lie ahead. For example, while driving along $1^{st}$ Street 410, the system may warn the user: "There is ice 402 ahead on the road." This safety feature allows the user to slow down his car and take other necessary safety precautions to avoid the dangerous and unsafe road condition that lies ahead. Likewise, the system also may inform the user of the auto accident 404 that is located ahead on "B" Street 412. For example, the system may state: "There is an auto accident 404 on "B" Street 412 that is blocking traffic. You may wish to slow down or take an alternative route. Accordingly, FIG. 4 illustrates the use of two dynamically acquired objects that aid in providing turn-by-turn travel directions.

Figure 5:
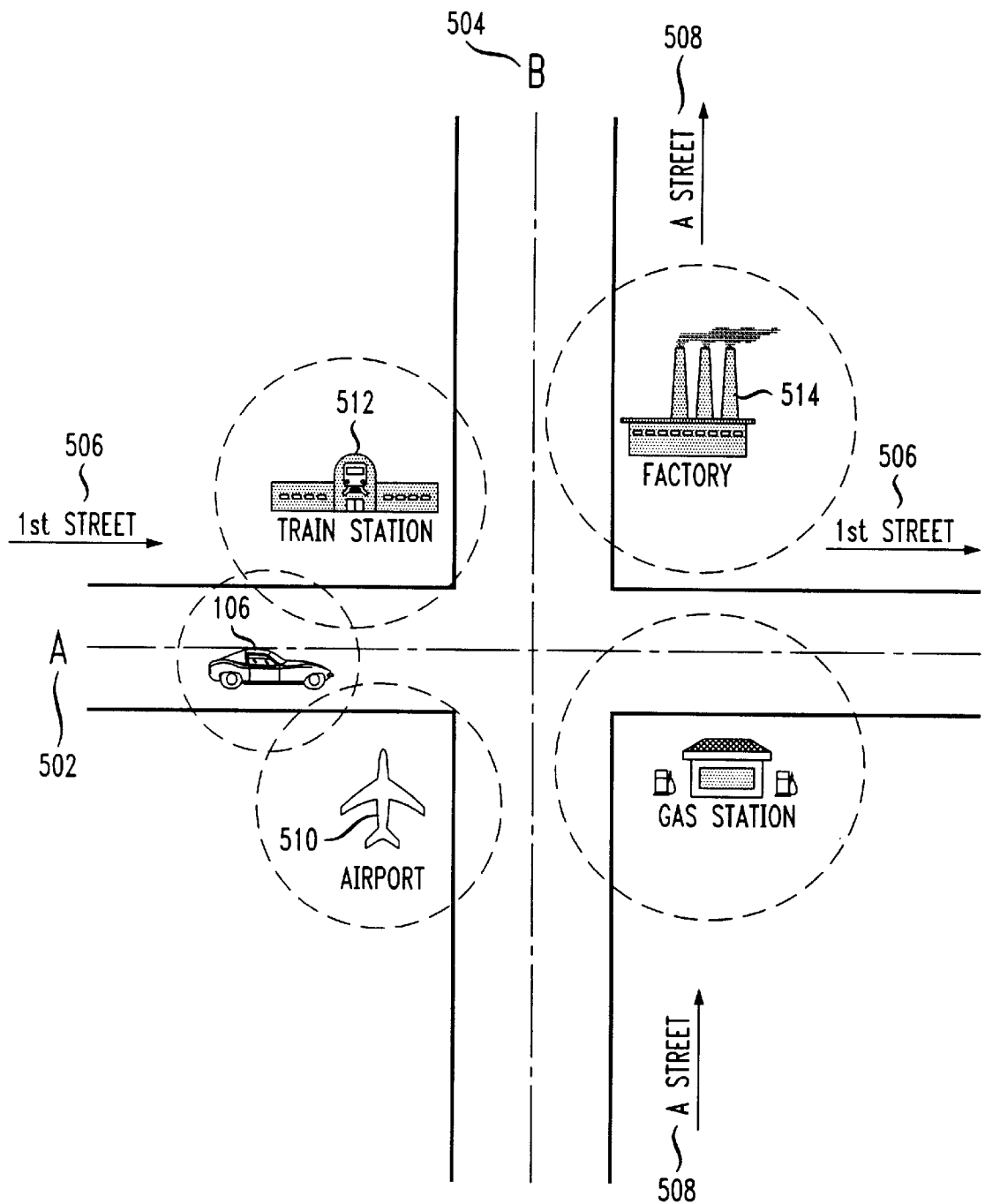
FIG. 5 provides a fifth illustration of a traveler along a route, the illustration providing an example of a four-way intersection.

FIG. 5 is another embodiment of the invention illustrating a four-way intersection. Here, the user is driving his car 106 from Point A 502 to Point B 504 and approaching a four-way intersection. As the user approaches the intersection of $1^{st}$ Street 506 and "A" Street 508, the system may verbally indicate to the user: "At the next intersection, you will see an airport 510 on your right and a train station 512 on your left. Turn left at the intersection. Once you turn left, you will be on "A" Street 508." In this example, the airport 510 and train station 512 may be examples of highly visible objects or prominent landmarks along the route. Continuing with the example, as the user turns left from $1^{st}$ Street 506 and proceeds down "A" Street 508, the system may verbally indicate to the user: "You are now on "A" Street 508 and passing an old factory 514 on your right. Continue driving until you reach your destination, which is straight ahead." Accordingly, the turn-by-turn driving directions with annotations significantly aid the driver in traveling from Point A 502 to Point B 504.

Figure 6:
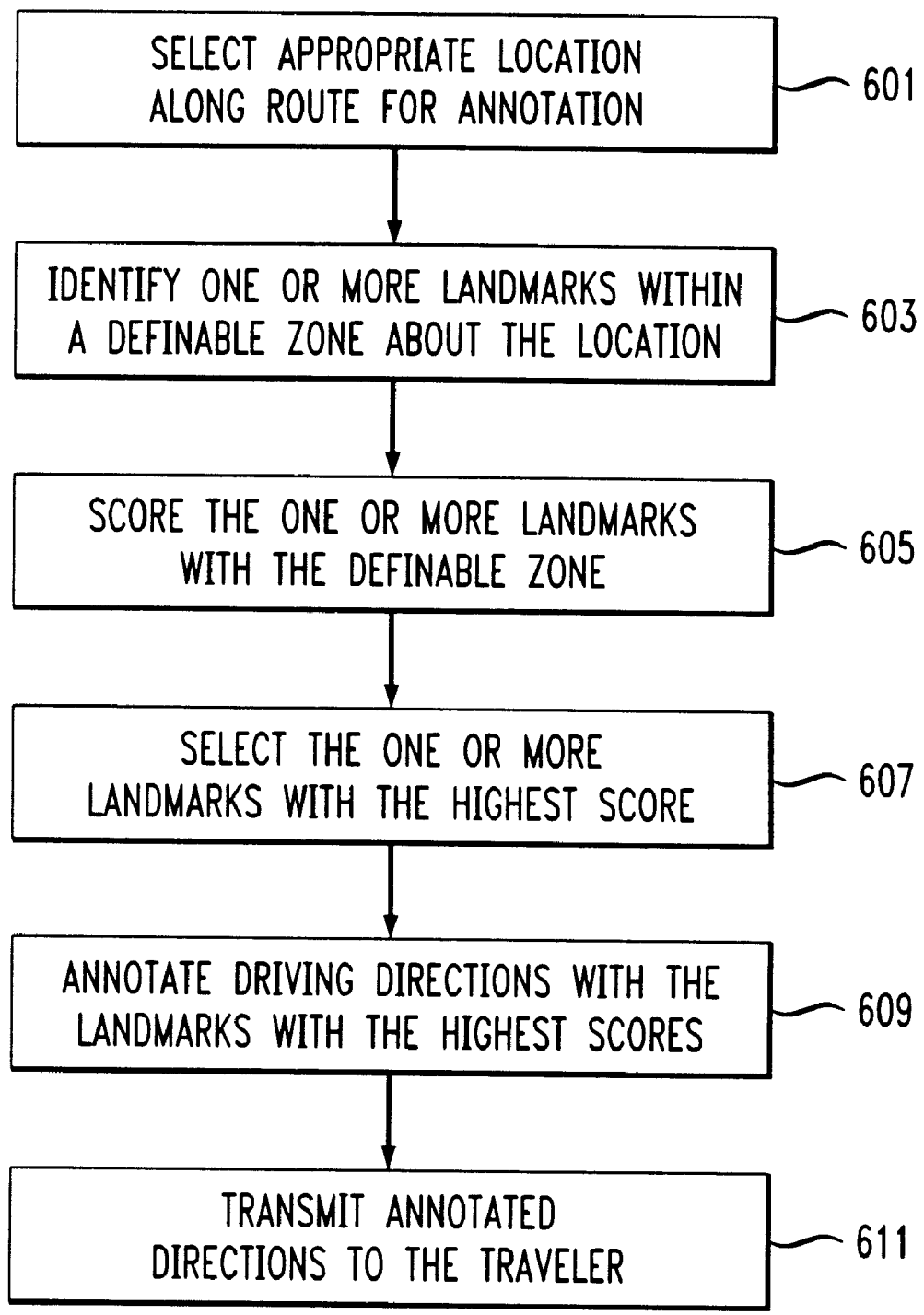
FIG. 6 is a flow chart of a method for practicing the present invention, according to an embodiment of the invention.

Finally, FIG. 6 is a flow chart of a method for practicing the present invention, according to an embodiment of the invention. In step 601, an appropriate location along the route is selected for annotation. In step 603, one or more landmarks are identified within a definable zone about the location. In step 605, the one or more landmarks that are within the definable zone are scored. In step 607, the one or more landmarks with the highest score are selected. In step 609, the driving directions are annotated with the landmarks having the highest score. In step 611, the annotated directions are transmitted to the traveler.

What is claimed:

1. A method for generating directions for a travel route, the method comprising:

obtaining a geographic location of a selected area along the travel route;

identifying a selected establishment within a configurable distance from the geographic location of the selected area, the configurable distance being configured as a function of at least an attribute of the selected establishment, wherein the attribute concerns at least the size of the selected establishment; and generating the directions that incorporate an identification of the selected establishment.

2. A method as in claim 1, further comprising maintaining a database including information regarding a geographic position of the selected establishment.

3. A method as in claim 1, wherein the attribute includes recognizability of a name of the selected establishment.

4. A method as in claim 1, wherein the database includes information regarding an orientation of the selected establishment relative to the geographic location.

5. A method as in claim 1, further comprising scoring one or more establishments within the selected area.

6. A method as in claim 5, wherein the selected establishment has the highest score of all of the establishments.

7. A method as in claim 1, wherein the attribute includes visibility of the selected establishment.

8. A method as in claim 1, wherein the attribute includes the shape of the selected establishment.

9. A method for generating directions for a travel route, the method comprising:

obtaining a geographic location of a selected area along the travel route;

identifying one or more landmarks corresponding to the geographic location of the selected area;

randomly selecting at least one of the one or more landmarks; and generating the directions that incorporate an identification of the at least one of the one or more landmarks.

10. A method as in claim 1, further comprising providing an audible recitation of the directions which includes an audible identification of the selected establishment.

11. A method as in claim 1, wherein the selected area comprises a turn from a first road to a second road.

12. A method as in claim 1, wherein the attribute includes a type of business conducted by the selected establishment.

13. A method for generating directions for a travel route, the method comprising:
obtaining a geographic location of a selected area along the travel route;
identifying at least one zone proximate to the selected area, the size of the zone being configurable as a function of at least an attribute of the travel route in the selected area, wherein the size of the zone is defined by a radius determined by an expansion factor;
identifying one or more landmarks within the zone;
deciding upon at least one of the one or more landmarks in the directions; and
generating the directions that incorporate an identification of the at least one of the one or more landmarks.

14. A method as in claim 13, wherein the shape of the zone is asymmetric.

15. A method as in claim 13, wherein the attribute concerns a complexity of the travel route in the selected area.

16. A method for generating driving directions for a route from a first location to a second location, the method comprising:
maintaining a database, the database comprising entities that are referenced by geocoded locations;
identifying one or more entities from the database within a configurable radius of a geocoded location of the traveler along the route, the geocoded locations of the one or more entities being defined by different zones, each zone having a size which is a function of at least an attribute of the entity defined by the zone; and
generating the driving directions that incorporate an identification of at least one of the one or more entities.

17. A method as in claim 16, further comprising the step of searching the database for landmarks that lie within a radius of a user's geocoded location along the route.

18. A method as in claim 17, wherein said radius is determined by an expansion factor.

19. A method as in claim 16, further comprising the step of performing progressively expansive radius searches of entities along the route based upon their geocoded locations.

20. A method as in claim 19, wherein said search is constrained by a maximum distance.

21. A method as in claim 16, wherein said entities are landmarks.

22. A method as in claim 16, wherein said entities are businesses.

23. A method for generating driving directions for a route from a first location to a second location, the method comprising the steps of:
a) obtaining coordinates proximate to a portion of the route corresponding to an appropriate location to confirm that a traveler is proceeding along the prescribed route;
b) identifying one or more establishments within a definable zone about the coordinates;
c) deciding upon at least one of the one or more establishments within the coordinate zone to include in the driving directions; and
d) generating driving directions that incorporate an identification of the at least one of the one or more establishments within the coordinate zone in the instructions regarding traversal of the route.

24. A method as in claim 23, wherein the step of identifying one or more establishments comprises the step of maintaining a database of records including information regarding the geographic location of a plurality of establishments.

25. A method as in claim 23, wherein the attribute includes recognizability of a name of the selected establishment.

26. A method as in claim 23, wherein the database includes information regarding an orientation of the selected establishment relative to the appropriate location.

27. A method as in claim 23, further comprising scoring one or more establishments having respective zones therearound covering the coordinates.

28. A method as in claim 27, wherein the selected establishment has the highest score of all of the establishments.

29. A method as in claim 23, wherein the attribute includes visibility of the selected establishment.

30. A method as in claim 23, wherein the attribute concerns the shape of the selected establishment.

31. A method as in claim 23, further comprising the step of providing an audible recitation of the driving directions which includes an audible identification of the selected establishment.

32. A method as in claim 23, wherein the attribute concerns the size of the selected establishment.

33. A method as in claim 23, the attribute concerns a type of business conducted by the selected establishment.

34. A method for generating driving directions for a route from a first location to a second location, the method comprising the steps of:
obtaining coordinates proximate to a portion of the route corresponding to an appropriate location to confirm that a traveler is proceeding along the route;
maintaining a database of establishments, the database including a plurality of records indicating establishments that have entered into a financial relationship with a directions provider to promote the establishments through the provision of driving directions;
identifying one or more establishments from the database within a definable zone about the coordinates;
deciding upon at least one of the one or more establishments within the definable zone to include in the driving directions; and
generating the driving directions that incorporate an identification of the at least one of the one or more establishments within the definable zone.

35. A method as in claim 34, wherein the step of identifying one or more establishments comprises the step of searching the database for one or more records corresponding to one or more establishments having a geographic location within a predefined distance from the appropriate location.

36. A method as in claim 34, further comprising the step of searching the database for one or more records corresponding to one or more establishments having a predefined orientation relative to the appropriate location.

37. A method as in claim 34, wherein the deciding step comprises scoring one or more establishments within the definable zone.

38. A method as in claim 37, wherein the scoring step includes determining the distance of the establishment under consideration to the appropriate location.

39. A method as in claim 37, wherein the scoring step includes evaluating the amount paid by the establishment to promote said establishment through the provision of driving directions.

40. A method as in claim 37, further comprising the step of selecting the establishment with the highest score.

41. A method for generating driving directions for a route from a first location to a second location, the method comprising:

obtaining coordinates proximate to a portion of the route corresponding to an appropriate location to confirm that a traveler is proceeding along the route;

maintaining a database of location-specific information objects, the database comprising data regarding the geocoded position of said information objects, said information objects being assigned respective expiration times after which said information objects become ineffective;

identifying one or more said information objects from the database within a definable zone about the coordinates;

deciding upon at least one of the one or more said information objects within the definable zone to include in the driving directions; and generating driving directions that incorporate an identification of the at least one of the one or more said information objects within the definable zone.

42. A method as in claim 41, further comprising searching the database for one or more records corresponding to one or more of said information objects having a predefined orientation relative to the appropriate location.

43. A method as in claim 41, wherein said information objects include at least one information object concerning a road closure.

44. A method as in claim 41, wherein said information objects include at least one information object concerning a road condition.

45. A method as in claim 41, wherein said information objects include at least one information object concerning a weather condition.

\* \* \* \* \*

UNITED STATES PATENT AND TRADEMARK OFFICE
CERTIFICATE OF CORRECTION

PATENT NO.    : 6,477,460 B2
DATED         : February 5, 2003
INVENTOR(S)   : Michael A. Kepler It is certified that error appears in the above-identified patent and that said Letters Patent is hereby corrected as shown below:

<u>Title page,</u>
Item [57], ABSTRACT,
Line 2, "retain" should read -- retail --.

Signed and Sealed this

Twelfth Day of August, 2003

JAMES E. ROGAN
*Director of the United States Patent and Trademark Office*